March 18, 1930. W. F. BERGER ET AL 1,751,189
ROLLER BEARING
Filed April 10, 1928
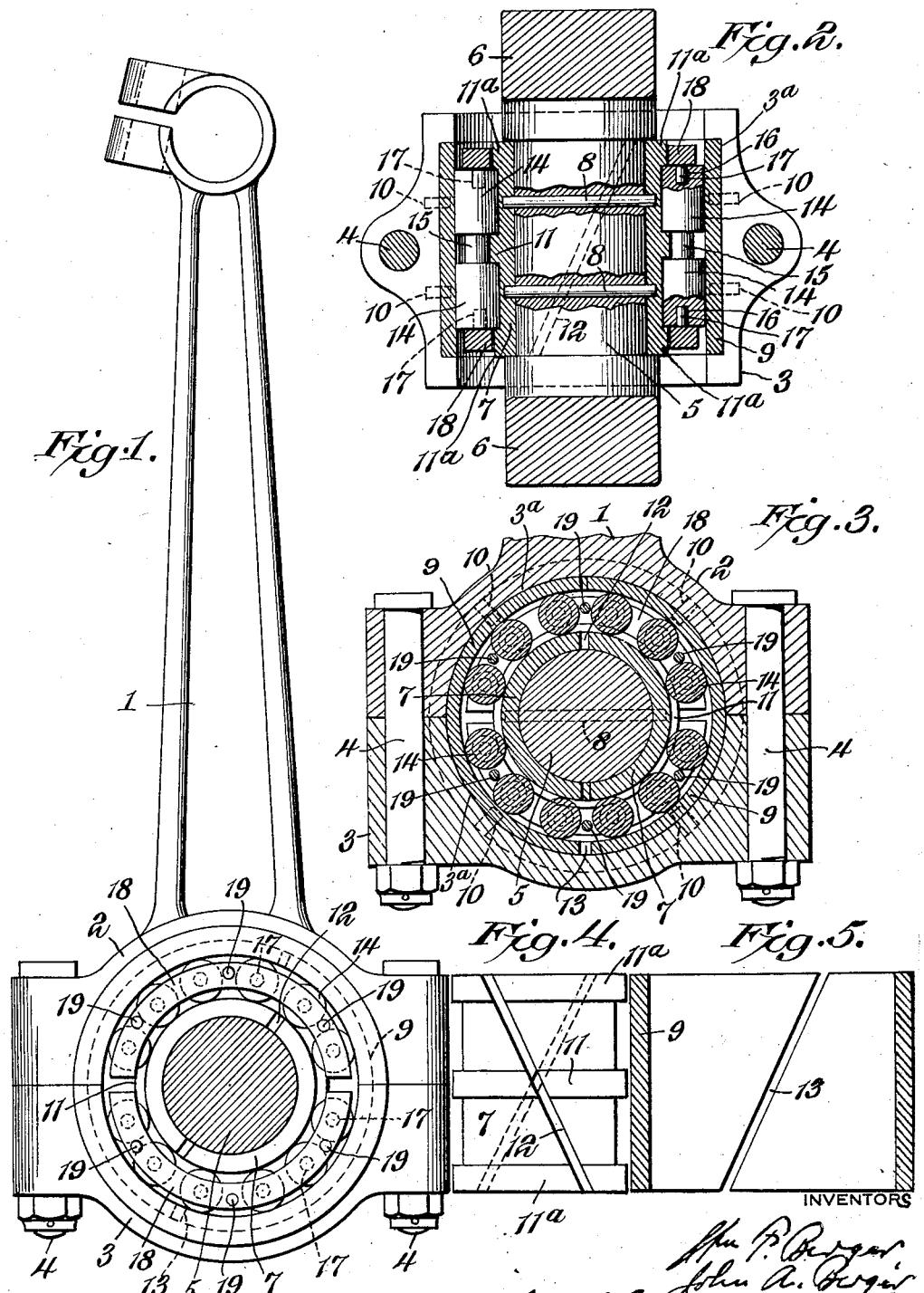
INVENTORS
ATTORNEY.

Patented Mar. 18, 1930

1,751,189

UNITED STATES PATENT OFFICE

WILLIAM F. BERGER AND JOHN A. BERGER, OF CANTON, OHIO

ROLLER BEARING

Application filed April 10, 1928. Serial No. 268,895.

This invention relates to roller bearings.

One object of the invention is to provide a bearing especially adapted for use in connection with cranks and crank rods or pitmen, especially in high speed motors such as automobile motors, to compensate for the thrust and to eliminate all play by the provision of a bearing, of the roller type, which may be easily installed on the crank pin and within the crank rod boxing and which will permit of ready renewal of the rollers when necessary.

Other objects will become apparent and a full and complete understanding of the invention may be obtained from a careful consideration of the following detailed description, taken in connection with the accompanying drawing forming a part of this specification; it being understood that while the drawing shows a practical form of the invention, the latter is not to be confined to strict conformity with the showing thereof, but may be changed or modified, so long as such changes or modifications mark no material departure from the salient features of the invention, as specifically brought out in the appended claims.

In the drawing, in which similar reference characters designate corresponding parts throughout the several figures:—

Figure 1 is a side elevation of an automobile crank arm or pitman, having the improved bearing installed therein.

Figure 2 is a horizontal section through the same.

Figure 3 is a vertical section thereof.

Figure 4 is a plan view of the sleeve or bushing used on the crank pin, and

Figure 5 is a detailed horizontal section through the outer cup or bushing.

While we have elected to show our improved bearing in connection with a crank and a crank and crank rod or pitman of the above described type it is to be understood that the invention is equally adaptable for use in other connections where smooth and accurate running of the bearing parts is required and where all lateral play is to be eliminated.

Referring more particularly to the drawing, 1 indicates a crank rod or pitman of a well-known type, having at its reduced, upper end, the usual eye for connection with a piston pin (not shown) and being enlarged at its lower end and provided with a semi-circular upper bearing member 2 and a correspondingly shaped lower member 3 coacting therewith in the usual manner and adapted to be held together by bolts 4.

The members 2 and 3 are each provided with alined semi-circular bores of relatively large diameter and each having an annular groove or seat $3^a$ formed therein, the ends of which are spaced from the sides of the members for a purpose to be described. The interior walls of the upper and lower members are normally spaced from the crank pin 5, which may be of the usual construction forming a part of the crank arms 6—6.

The crank pin 5 is provided with a circumferential seat on which are placed semi-circular bushing members 7, each provided with apertures for the reception of the ends of pins 8 passing through the crank pin, as clearly shown in Figure 2, to cause the bushing to positively turn with the crank pin. Seated within the annular groove or seat $3^a$ is a pair of semi-circular cup members 9 which are thus prevented from lateral movement by contacting with the end walls of the groove and which are further secured in position by means of pins 10 anchored within the upper and lower members 2 and 3 respectively, and having their projecting ends fitting in suitable recesses in the semi-circular cup members 9. The bushing members 7, which, when applied to the crank pin, may be termed a cone member, are each provided with an outstanding, centrally-disposed flange 11, and terminal flanges $11^a$, and the abutting edges of the sections comprising the cone are arranged at opposite angles as indicated at 12 in Figure 4 of the drawing, for the purpose of more readily permitting the passage of antifriction rollers, about to be described, and for the same reason the outer, or cup members 9 have their abutting edges arranged at opposite angles, as shown at 13 in Figure 5 of the drawing.

Twin steel roller 14 are employed to traverse the surface of the cone member at each side of the central, outstanding flange 11 and to abut at their outer ends against the terminal flanges 11ª, and as the rollers are joined by an integrally-formed, reduced portion 15, it will be seen that the flanges 11 and 11ª will prevent the rollers from moving transversely of the bearing, while they contact at their inner radial points upon the cone member and at their outer radial points against the cup member.

In order to insure the proper spaced relation between the rollers at all times, they are provided in their ends with seats or sockets 16, into which fit pins or trunnions 17 which are carried, in proper spaced relation, by means of substantially semi-circular rings 18 held a proper distance apart by tie rods 19 interposed between certain of the rollers and suitably shouldered and riveted, or otherwise connected to the ring members in a manner to permit the rollers to freely revolve.

These semi-circular ring members constitute a cage for causing the rollers to remain truly parallel with the longitudinal axis of the crank pin 5 and to cause the same to travel the space between the cup and the cone members without binding on the flanges 11 and 11ª.

The cup and cone members, it should be stated, are formed of harder steel than the rollers, to compensate for any wear, and it will be seen that the entire device, because of the semi-circular formation of the sections of the inner bushing, as well as the sections of the outer cup member, may be readily positioned in their respective seats, and that the rollers may also be readily placed in operative position therebetween, by reason of the fact that they are carried by semi-circular ring sections which are held together to prevent their lateral movement, the entire series of rollers being likewise guided and held against lateral movement by the flanges 11 and 11ª. An additional advantage of the structure disclosed is the method of forming the abutting edges of both the inner and outer roller face members, wherein the angularly disposed abutting edges will cause the rollers to pass over the joint without binding or being retarded thereby, in an obvious manner.

From the foregoing, it will be seen that simple means for reducing the friction between cranks and crank pins or in similar locations in high speed mechanism has been provided, which may be easily installed, and which may be readily replaced when worn or broken, the particular construction providing means for holding the rollers in true alinement and being of a strong and durable nature to withstand the strain to which such devices are subjected in use.

What is claimed:

1. In an anti-friction bearing for cranks and connecting rods, a two-part bearing, each part formed with an internal recess to receive a cup-shaped segmental member seated in said recesses, having their ends adjacent to the end walls of the recesses, and keyed against rotation, a crank-pin, segmental bushings keyed to the crank-pin to rotate therewith, spaced from the segmental cup-shaped members and formed externally with end flanges and a centrally disposed flange, twin-rollers disposed between the segmental bushings and cup-shaped members in rolling contact with the bushings and cup-shaped members, the ends of the rollers being disposed for engagement with side faces of the end and centrally disposed flanges of the bushing, and rings upon which the rollers are rotatably mounted, said rings being tied one to the other and disposed to contact with the peripheral faces of the end flanges of the segmental bushings.

2. In an anti-friction bearing for cranks and connecting rods, a two-part bearing, each part formed with an internal recess to receive a cup-shaped segmental member, cup-shaped segmental members seated in said recesses, having their ends adjacent to the end walls of the recesses, and keyed against rotation, a crank-pin, segmental bushings keyed to the crank-pin to rotate therewith, spaced from the segmental cup-shaped members and formed externally with end flanges and a centrally disposed flange, twin-rollers disposed between the segmental bushings and cup-shaped members in rolling contact with the bushings and cup-shaped members, the ends of the rollers being disposed for engagement with side faces of the end and centrally disposed flanges of the bushing, rings upon which the rollers are rotatably mounted, said rings being tied one to the other and disposed to contact with the peripheral faces of the end flanges of the segmental bushings; the adjacent edges of the segments of the bushings and adjacent edges of the cup-shaped members being disposed at oblique angles extending longitudinally thereof, the angle of one being at an opposite angle to the other.

In testimony whereof we affix our signatures.

WILLIAM F. BERGER.
JOHN A. BERGER.